United States Patent [19]

Van Winkle

[11] 4,150,300

[45] Apr. 17, 1979

[54] ELECTRICAL AND THERMAL ENERGY SUPPLY SYSTEM FOR BUILDINGS

[76] Inventor: Martin Van Winkle, R.F.D. #1, Ashland, N.H. 03217

[21] Appl. No.: 737,842

[22] Filed: Nov. 1, 1976

[51] Int. Cl.$^2$ .................................................. T24D 13/00
[52] U.S. Cl. ........................................ 290/2; 290/1 R; 290/4 R; 290/44; 290/55; 237/12.1
[58] Field of Search .................... 290/1, 2, 4 R, 50, 44; 237/12.1

[56] References Cited

U.S. PATENT DOCUMENTS

| | | | |
|---|---|---|---|
| Re. 21,576 | 9/1940 | Berryman | 290/2 |
| 903,935 | 11/1908 | Wilson | 290/55 X |
| 1,009,320 | 11/1911 | Kitchen | 290/2 |
| 1,552,661 | 9/1925 | Apple | 290/2 |
| 2,130,606 | 9/1938 | Wanamaker | 237/12.1 |
| 2,579,311 | 12/1951 | Fairey | 290/2 |
| 3,678,284 | 7/1972 | Peters | 290/1 |
| 3,944,837 | 3/1976 | Meyers et al. | 290/4 R |
| 3,946,242 | 3/1976 | Wilkerson | 290/4 R |

Primary Examiner—Robert K. Schaefer
Assistant Examiner—John W. Redmam
Attorney, Agent, or Firm—John M. Brandt

[57] ABSTRACT

An electrical and thermal energy supply system for buildings is disclosed wherein electricity is generated by an engine driving a generator either inside or in close proximity to the building. Heat generated by the engine is recovered and supplied to the building. The electrical generating system is activated on demand for electricity from within the building. Optionally, the output of the generator may be used to electrically heat water or air, or both, to supplement the heat recovered from the operation of the engine. Additionally, a battery-inverter, chargeable by the generator, may be included to reduce the duty cycle of the engine. A wind powered generator may be further added to charge the battery and conserve fuel, especially in warmer time periods.

8 Claims, 2 Drawing Figures

ELECTRICAL AND THERMAL ENERGY SUPPLY SYSTEM FOR BUILDINGS

BACKGROUND OF THE INVENTION

1. Field of the Invention

The invention resides in the field of energy supply systems and relates more particularly to systems in which heat is recovered and utilized from an engine employed to drive an electrical generator.

2. Description of the Prior Art

A number of devices exist in the prior art in which heat is recovered from an engine used within a vehicle or structure for a prime purpose other than that of providing heat. Examples include U.S. Pat. No. 937,879, Smith, wherein the exhaust from a general purpose engine is used to heat a boiler; U.S. Pat. No. 1,925,646, Rakestraw, wherein an auxiliary oil burner augements heat available from engine exhaust gases; and U.S. Pat. No. 2,784,549, Henney, wherein a heat reclamation system suitable for use in a railroad car is disclosed.

More particularly, an extensive system for supplying electricity to and heating buildings is described in U.S. Pat. No. 3,678,284, Peters. That system employs an automatic or programmed mode of operation for the engine-generator. The system is activated and electricity and heat are produced on a set time cycle according to predetermined periods of peack usage and need. As described in the summary below, the present invention improves on and departs from the prior art in its manner of activation and in the utilization of additional components to improve the flexibility and efficiency of the concept.

SUMMARY OF THE INVENTION

The invention may be summarized as an on-site energy supply system suitable for all types of buildings and enclosures requiring heat and electricity. Such buildings, in addition to all of the types which can be occupied as housing, may also include greenhouses, storage structures, and other units of a similar nature.

The basis of the invention is the capture and utilization for heating purposes of exhaust, engine cooling and friction heat produced from the burning of fuel in an internal combustion engine driving a generator, which generator is arranged to supply electricity on demand to a building. The heat and electricity so supplied may constitute all or only a part of the energy requirements of the building, the rest originating from other sources such as heat from gas or oil-fired hot air or water furnaces, and electricity from electrical utility companies. A supplementary batter-inverter unit may be integrated into the system with appropriate switching mechanisms to supply small amounts of electricity at such times as the larger output of the engine-generator is not required. The engine-generator is then additionally employed to recharge the battery-inverter unit. A wind driven generator may be further added as an auxiliary means of recharging the batteries. The output of the generator may also be used to power electrical heating elements for heating either air or water used in the building thermal energy system, thus charging electical energy to heat when a demand for additional heat is necessary. Such apparatus for distributing heat water or air is normally available in existing structures.

Although, as noted in the prior art above, systems which recover or capture the exhaust, fuel burning, or friction heat of engines used to drive generators are known, the inventor is unaware of any system in which the electricity is generated on demand, that is, by the switching on of an appliance or other electrical device within the building that the system supplies. Further, no system which uses either a battery-inverter unit depending on load requirement, or an electrically powered booster for heating air or water in conjunction with a demand control, has been heretofore disclosed to his knowledge. Also, no system of this type which changes electrical energy to heat energy when electrical energy is not needed has been disclosed prior to this time.

The addition of the demand control greatly improves the efficiency of prior systems by eliminating the operation of the engine when there is no requirement for electricity. This is especially true for small buildings such as single-unit households, where the demand for power may be almost nonexistant at times. The addition of the battery-inverter further improves efficiency by limiting the use of the engine-generator to those times when substantial power is required, for example the operation of a stove or electric range. Efficiency and flexibility are further improved when the engine-generator is used to power an auxiliary hot water or hot air booster while operating to supply regular, high load appliance demands, since the efficiency of most engine-generator units of a size suitable for use with this system increases with output. These and other features and advantages of the invention will become more clear from the description of the preferred embodiment taken in conjunction with the drawings, which follows.

DESCRIPTION OF THE PREFERRED EMBODIMENT

Figure 1:
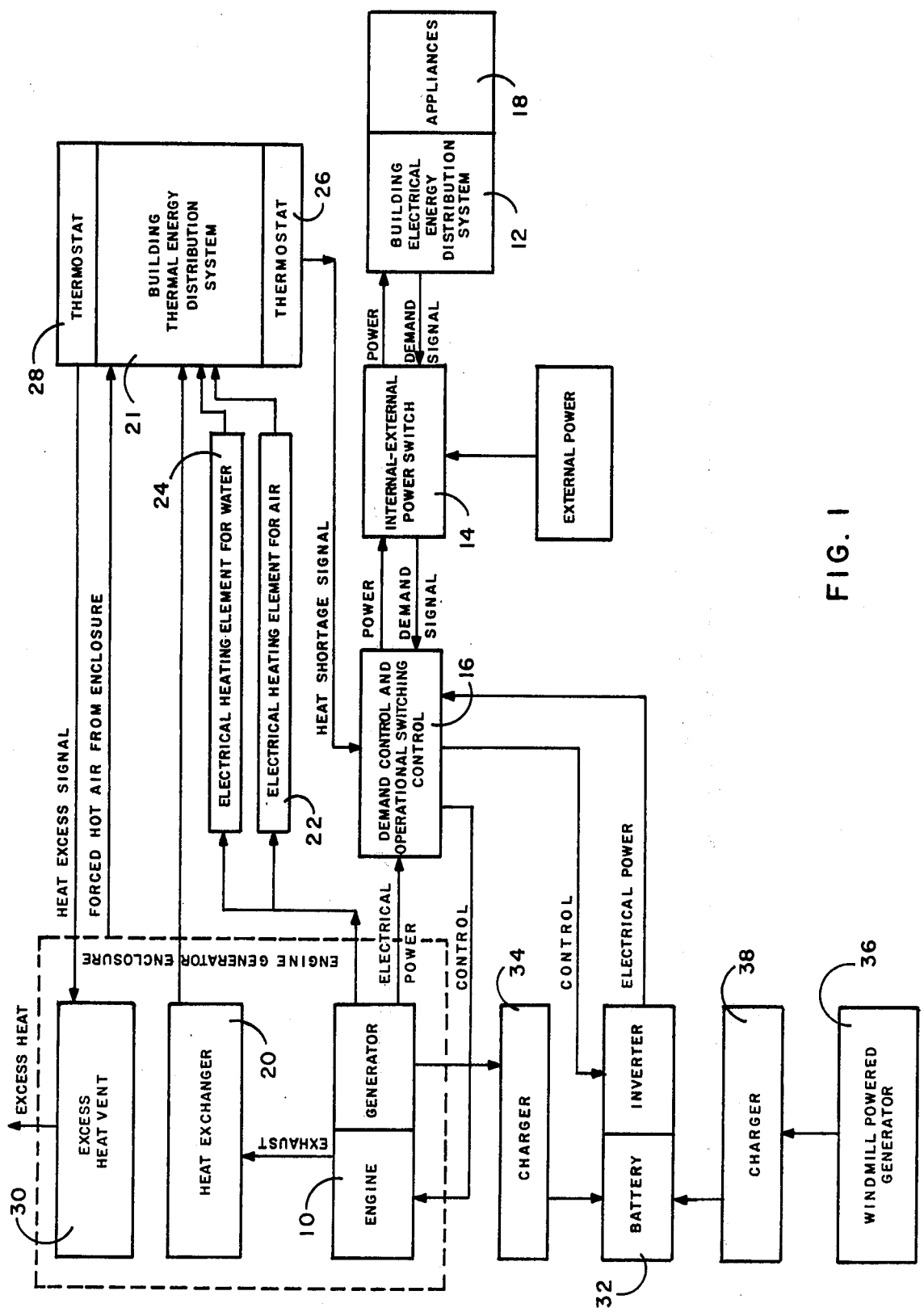
FIG. 1 is a block diagram of one embodiment of the system which comprises the invention.

Referring first to FIG. 1, there is shown in block diagram format the elements of the apparatus of the invention. The building may house all or a part of the system. A portion of the equipment, such as the engine-generator 10, may be placed outside the building, but in close proximity to it, to isolate the building from noise and vibration. The engine-generator may be of any convenient size and output wattage, and should be located in a thermally, and noise insulated enclosure. An underground installation is suitable. A typical unit for a one-family house could consist of a 10-20 hp diesel fuel engine and a six to ten kilowatt generator. The output of the generator is routed to the building electrical energy distribution system 12, the main junction box of an existing building, for example. Where outside power is supplied to the building by a utility company, a manual or automatic power failure switch 14 can be used to switch back and forth from internal to external power. The building's internal distribution system, the wires and outlets in the typical house, supplies power to various applicances, lights, and the like. A demand control 16, such as are commercially available from the Wincharger Corporation, Sioux City, Iowa is used to energize the engine and initiate the flow of power to the building.

This is accomplished by the attempted operation of any of the appliances 18 within the building by closing a switch creating a closed circuit path from the demand control to the building and back again. A current path for a low voltage power source, a battery within the demand control unit for example, is thus established. This low voltage current activates a starting circuit for the engine within the demand control, starting the engine by activating, for example, a battery-operated starting motor, not shown, which engine in turn drives the generator to produce electrical power.

Running of the engine produces a large quantity of combustion heat and some friction and exhaust heat, which radiates from the engine casing. The exhaust heat may be recovered by passing the exhaust through a heat exchanger 20 to heat water or air, which is then fed into the building thermal energy distriction system 21 by circulating pumps or circulating fans as may be required. It will be understood that this distribution system may consist of either hot air ducts or hot water radiators, or both. Friction and combustion heat radiating into the atmosphere of the enclosure from the engine may be recovered by forcing air, by a fan for instance, from the enclosure into ducts which comprise the building's thermal energy distribution center. An additional advantage is obtained by this forced air input in that a slight amount of pressure is created within the building which reduces drafts from the outside environment.

As shown, the generator may further be used to power electrical heating elements 22 and 24 for heating additional amounts of hot air or hot water, or both. The air or water heated in this way may be introduced into the building in a manner similar to that described above.

If desired, an additional control in the form of a thermostat 28 within the building may be introduced to operate the engine for the purpose of providing heat when the temperature of the building falls below a certain point. In that case, the system is both electrical and heat demand controlled.

Provision may be made to vent excess heat to the atmosphere outside the building when a thermostat 28 within the building determines that a preselected temperature has been reached. Such a vent 30 illustrated schematically may consit of an exhaust fan and portal, operable by the thermostat, to remove heat from the engine-generator enclosure.

In many installations, it may be desirable not to start and stop the engine each time a low power apparatus is activated within the building. Lights, radios, television, some kitchen appliances, and power tools are examples of devices which may be supplied by a battery-inverter unit 32 having an output of a kilowatt or so. Such a unit as shown in FIG. 1 must supply the same distribution system as the engine-generator and additionally must be accompanied by a switching mechanism to discern between high and low power requirements and to switch the engine-generator into the system at a selected power requirement level. An operational switching control circuit for accomplishing this operating with and shown in conjunction with the demand control 16 will be described in detail below.

The battery-inverter will normally be recharged from the generator by a charger 34 while operating to supply electrical requirements on signal from the demand control. An additional windmill powered generator 36 can also be used to recharge the battery-inverter through charger 38 reducing the operation of the engine, resulting in fuel economy. The windmill-generator is especially desirable when the system is in use in warm periods when little or no heat from operating the engine is required.

Figure 2:
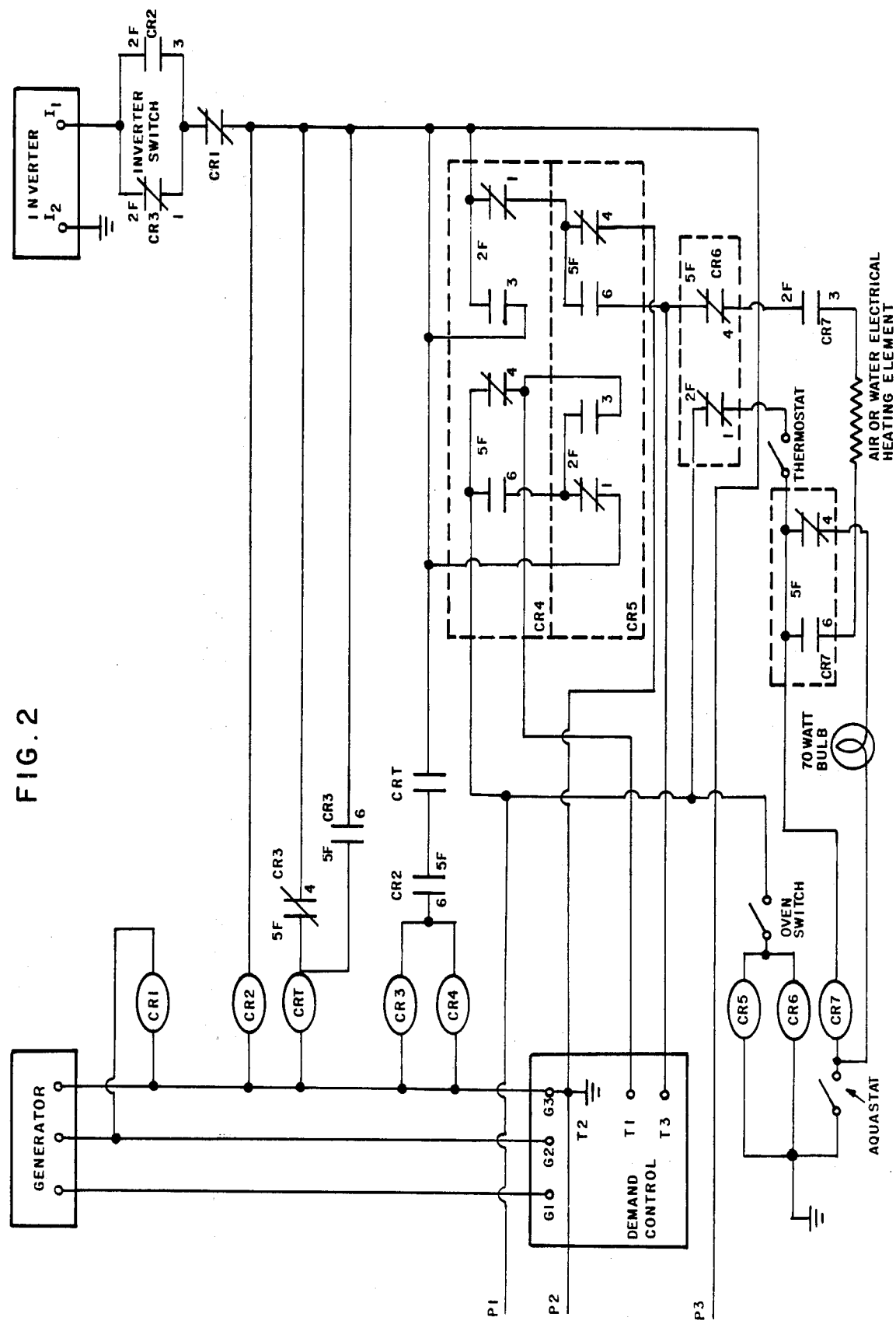
FIG. 2 is a detailed diagram of the switching controls of FIG. 1.

Referring next to FIG. 2, there is shown in schematic form a detailed diagram of a operational switching control which may be used in operating the system described above in various modes of performance. The switching control, used in conjunction with the demand control, is comprised primarily of a series of relays arranged to provide power from either the battery-inverter unit or the engine-generator. As previously mentioned, this control is optional in the sense that a demand control of the type specified above is designed to activate the engine alone when a battery-inverter is not employed.

Each relay is given a C. R. designation. The oval symbols enclosing the relay designations represent the operating coils of the respective relays. The relays used are mostly of double pole, double throw design, which allows them to serve more than one switching function. The points are indicated by a double bar. A double bar without a slash indicates an open contact in the unenergized state. A double bar with a slash indicates a closed contact in the unenergized or relaxed state. The points associated with each relay are enclosed in a dotted line with the relay designation inside or a relay designation is placed next to the corresponding point. One side of each relay has fixed points designated 1 and 3 and the floating point designated 2F. The other side has fixed points designated 4 and 6 and the floating point 5F. Single pole relays have no point designation. Each relay is depicted in an unenergized or relaxed state in the diagram. The state of each contact will reverse from that shown upon activation of the associated coil.

Terminal $T_1$, $T_2$, and $T_3$ are the points or terminals at which the building electrical energy distribution system a three line power line system in this case, is connected to the previously specified demand control. $T_2$ is the common line. A power requirement across $T_1$–$T_2$ will enable the demand control. Upon operation of the engine-generator, power will be supplied across both $T_1$–$T_2$ and $T_3$–$T_4$.

The principle of the demand control specified above is that a power requirement within the building, turning on a light for example, closes a path which allows a low voltage signal current path to be completed through the power lines causing the demand control to function to start the engine. When the engine is started and the generator provides power, the signal current is removed and the output of the generator fed over the same power lines.

Terminals $G_1$, $G_2$, and $G_3$ are the generator connections within the demand control. $G_2$ is the common line and the voltage rating at $G_1$ and $G_3$ is typically 110 volts each, which can be combined to provide 220 volts.

$I_1$ and $I_2$ are the inverter terminals with $I_2$ designated common or ground. An inverter switch is comprised of CR1, CR2 points 2F and 3 and CR3 points 1 and 2F.

In the arrangement shown, it is presumed that the normal or base state is that a small amount of power is required in the building which is supplied by the battery-inverter unit. The engine-generator is activated when there is a demand for a larger amount of power than can be provided by the battery-inverter unit. Since the battery-inverter is in the activated state, those relays activated by inverter current will be in the opposite state from that shown in the diagram.

The pattern of engine-generator activation is a follows. An increased demand for power over the output capacity of the battery-inverter causes a voltage drop which momentarily relaxes CR2, a relay which drops out of relaxes below a certain activating voltage. CR2 points 3 and 2F in the inverter switch open causing an interruption in the inverter current which relaxes CRT, a time dealy relay. The CRT points open causing CR3 and CR4 to relax. The inverter current resumes through CR3 points 1 and 2F. However, it does not reach the building power lines $P_1$ and $P_3$ since it is connected through CR4 points 3 and 2F to one side of the power line $P_3$, and CR4 points 6 and 5F to the other side of the power line $P_1$, both of which are now open. Instead, power line $P_1$ is now connected to the $T_1$ terminal of the demand control through CR4 points 4 and 5F.

The inverter current does reach CRT through CR3 points 5F and 4 causing it to begin a time delay cycle at the end of which CRT points will close reactivating CR3 and CR4 returning the system to inverter power. During the delay, a period of five or ten seconds, the power requirement across $T_1$ activated the demand control causing the engine-generator to start. When the engine-generator starts producing power, the CR1 coil energizes and the CR1 points open interrupting the inverter power. CRT ceases to be energized and the CRT points remain open leaving CR3 and CR4 relaxed, transferring the entire system to the engine-generator. If the engine-generator does not start, the system reverts to the inverter and, if the excess demand is still present, the entire cycle just described begins again. This will continue until an over-cranking relay in the demand control, not shown, causes the engine to cease cranking indicating a mechanical problem in the engine, which must be rectified before the system will operate.

At such time as the power demand ceases at $T_1$, the design of the demand control will cause the engine-generator to stop, relazing CR1 and reactivating the inverter to return the system to the normal or base state. By selecting the appliances placed on $P_1$ or $P_3$, control over the demands of the system is obtained such that the engine-generator activates only at those times when a high power requirement appliance is turned on. The inverter switch is shown interrupting the inverter output. Optionally, the same arrangement may be used to interrupt the battery supply to the inverter, accomplishing the same result.

Other control functions may be included depending upon the manner in which the system is to be operated. For example, additional relay CR5 is shown as activated by a specific high power appliance, a kitchen range. The function of that relay is to directly transfer the power lines from the inverter to the starting terminal $T_1$ of the demand control without relying on the drop out function of CR2.

Optional auxiliary electrical heating elements specified in the system described above may be used to heat either air or water or both to provide for the most efficient use of the output of the engine-generator. As shown, an aquastat is used to sense the temperature of water used in the heating system and a thermostat the temperature of the air in the building. Below a selected temperature, either of these will act to start the engine generator to provide power to the high wattage electrical heating element and to further heat the building through the recapture of engine heat. CR6 acts to remove the electrical heating element from the system when a high power appliance such as the range is on. CR7 is a control relay operated by the termostat or aquastat and functions to switch the electrical heating element to the demand control below selected temperatures or air or water.

As will be obvious to those skilled in the art, modifications may be made to the above described apparatus without departing from the concept of the invention, which accordingly is defined by the following claims.

What is claimed is:

1. An energy supply system for a building for generating electrical and thermal energy for use within said building, said building having an electrical and a thermal energy distribution system, said system comprising in combination:
   a. a fuel energized engine;
   b. an electrical generator driven by said engine;
   c. heat recovery means for recovering heat generated by said engine;
   d. means connecting said heat recovery means and the thermal energy distribution system of said building;
   e. an auxilliary storage battery;
   f. an inverter powered by said battery connected to the electrical distribution system of said building for supplying electrical power to said building within the capacity of said storage battery;
   g. means for charging said battery by said generator; and
   h. switching control means comprising:
      1. demand control means for activating said engine upon demand for electrical energy within said building exceeding the capacity of said auxiliary storage battery; and
      2. switching means for connecting the electrical output of said generator to the electrical distribution system of said building and for disconnecting the inverter from said electrical distribution system upon activation of said engine.

2. The apparatus of claim 1 further including;
   a. venting means for venting excess heat from said heat recovery system external to said building; and
   b. temperature responsive control means within said building for activating said venting means.

3. The apparatus of claim 1 wherein the thermal energy distribution system of said building is comprised in part of a hot water distribution system and said apparatus further includes:
   a. electrical heating elements means arranged to heat water;
   b. means to supply said heat heated water to said hot water distribution system; and
   c. means for connecting the electrical output of said generator to said electrical heating element means.

4. The apparatus of claim 3 further including temperature responsive control means within said building for activating said engine.

5. The apparatus of claim 1 wherein the thermal energy distribution system of said building is comprised in part of a hot air distribution system and said apparatus further includes:
   a. electric heating element means arranged to heat air;
   b. means to supply said heated air to said hot air distribution system; and
   c. means for connecting the electrical output of said generator to said electrical heating element means.

6. The apparatus of claim 1 further including temperature responsive control means within said building for activating said engine.

7. The apparatus of claim 1 further including:
   a. a wind-driven generator; and
   b. means for charging said battery by said generator.

8. The apparatus of claim 2 further including:
   a. an external source of electrical power; and
   b. means for connecting said external source to said electrical distribution system and disconnecting said inverter output and said generator output from said electrical distribution system.

* * * * *